Sept. 21, 1965   R. M. BURFORD ETAL   3,207,365
CHEMICAL APPARATUS AND METHOD
Filed June 11, 1964   3 Sheets-Sheet 2

INVENTORS.
ROBERT M. BURFORD
WILLIAM V. BAULT
PHILLIP O'NEILL
BY *Richard Coale Williams Jr.*
ATTORNEY

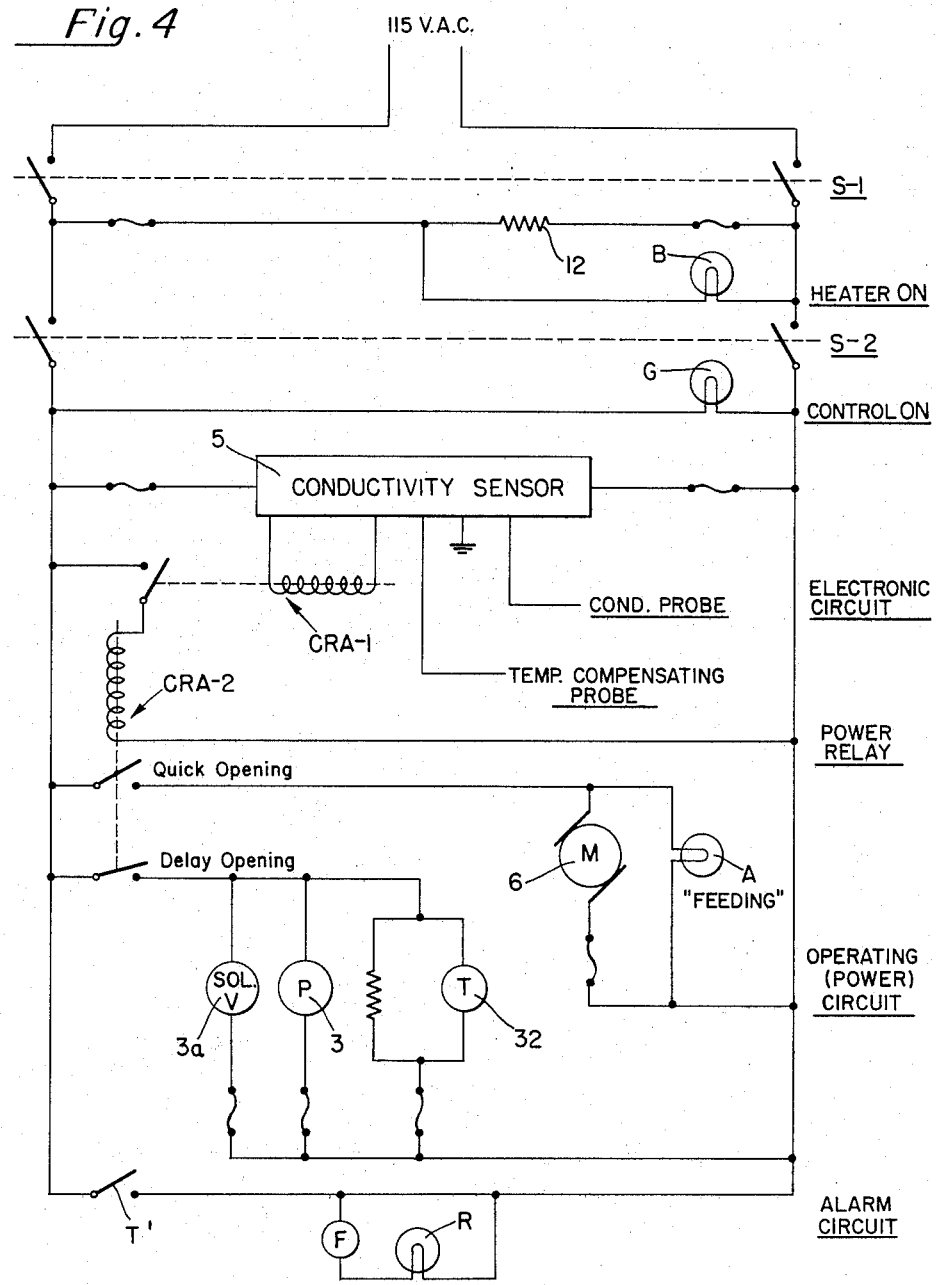

3,207,365
CHEMICAL APPARATUS AND METHOD
Robert M. Burford, Malvern, William V. Bault, Villanova, and Phillip O'Neill, Philadelphia, Pa., assignors to Pennsalt Chemicals Corporation, Philadelphia, Pa., a corporation of Pennsylvania
Filed June 11, 1964, Ser. No. 374,518
11 Claims. (Cl. 222—1)

This invention relates to novel apparatus and processes for the maintaining of predetermined concentrations of water soluble salts in solutions used in work tanks, e.g., as used in the electroplating, metal cleaning and related industries. In particular, this invention relates to methods for accomplishing the controlled addition of water soluble hygroscopic powdered materials, with minimal clogging of feed equipment.

Automatic feeding of dry powdered materials such as sodium hydroxide is important to the efficient operation of many processes. However, because of the very humid atmospheres which commonly prevail in tank rooms in the electroplating, metal cleaning and other industries, the feeding of dry powdered hygroscopic materials has presented a common problem. Most such materials are fed by vibratory or screw type dry feeders of conventional design but the humidity of the surrounding atmosphere frequently causes caking of the powder and binding or clogging of the dry feeder mechanism.

To avoid this problem, and the mechanical abuse to which the equipment is commonly subjected when located in the tank rooms, the hygroscopic powdered materials have sometimes been added to smaller dissolving tanks located in rooms separate from the tank rooms in which the working solutions are used. Remote location to some extent avoids the high humidity caused by the solutions in the tanks and by drag out of work moving through the work baths. However, because most of the depleted solutions being pumped from the work baths to the dissolving chambers will be at elevated temperatures, the atmosphere immediately above the dissolving chambers is increased in humidity by evaporation from the liquids into which the dry feeder is to discharge its dry powdered materials. Pick up of moisture by the hygroscopic material particularly on the vibrating portions of vibratory dry feeders or in the screw conveyor portions of screw type dry feeders causes frequent clogging, equipment corrosion and malfunction.

By specialized design and operation of the dissolving system, the present invention permits dry feeders to discharge into the dissolving chamber without being subjected to high humidity and maintains a current of ambient air away from the dry feeder mechanism down into the dissolving chamber thus preventing vapors from rising from the hot liquids in the dissolving chamber and causing clogging of the hygroscopic powdered materials in the dry feeder.

The present invention includes apparatus comprising in combination:

(A) A sensor for detecting low concentrations of a water soluble inorganic hygroscopic salt in an aqueous working solution, (B) An intermittently operated dry feeder for powdered materials operating in response to a signal from said sensor and feeding dry materials at a pre-set constant rate, said dry feeder being shut off by a signal from said sensor indicating a satisfactorily high concentration in said working solutions, (C) A substantially conical dissolving chamber located directly beneath the discharge of said dry feeder, said dissolving chamber having wash down means for continuously injecting a stream of wash down liquid into said chamber to wash said hygroscopic powdered materials downward through the bottom outlet of said dissolving chamber, the flow of said wash down liquid being sufficient to prevent bridging of the bottom outlet of said conical dissolving chamber and being insufficient to cause overflowing of said wash down liquid from said dissolving chamber, (D) A liquid operated ejector having an inlet and an outlet and a vacuum side arm substantially at right angles to the main path between said inlet and said outlet, said vacuum side arm being below and communicating substantially directly with the bottom discharge of said conical dissolving chamber, (E) Means for delivering a stream of said working solution to the inlet of said ejector, said stream pulling a vacuum on said side arm and passing out the outlet of said ejector, (F) Conduit means for conducting said stream of working solution together with the powdered material from said conical discharge chamber from the outlet of said ejector back to a point of use of said working fluid.

The sensor will preferably be a device for measuring conductivity of the solution but may alternatively be a colorimeter, that is, a device for measuring light transmission of given wave lengths through a cell filled with working solution, a pH meter, that is a device for measuring the negative logarithm of the hydrogen ion concentration of the working solution, an automatic titration apparatus for titrating the content of said dry powdered material dissolved in said working solution or other effective analytical device for determining the concentration of the material being added by the dry feeder to the working solution. The signal from the sensor may be transmitted electrically or pneumatically or by other means and may be either continuous or intermittent. The signal may be received directly by the motor of the dry feeder or may be transmitted through relays, computer devices, transducers or other linkages.

The intermittently operated dry feeder will preferably be of the hopper fed variety wherein material moves from an upper hopper and is conveyed by the action of a constantly moving element toward a discharge point from which the dry powdered material falls into the conical dissolving chamber. Most preferably the dry feeder will be of the screw conveyor type wherein the dry powdered material is fed from an upper hopper by means of screw flights advancing toward the discharge point. Especially preferred among screw feeders will be those in which the screw flights are discontinued at a point just prior to the discharge of the screw feeder and are separated from the discharge end bearing by a flightless shaft extension thus preventing packing of the dry powder hygroscopic materials at the point of discharge. Because of the hygroscopic nature of the materials being fed by the apparatus of the present invention it will also be preferable to heat the dry feeder portions in which clogging is most likely to occur by means of resistance heaters or other means to a temperature at least above the dew point of the surrounding air.

By substantially conical dissolving chamber is meant a chamber having slanting, tapering or curved sides to direct the dry powdered material and the wash down liquid toward an outlet preferably located at the center of its bottom and in any case located at the lowest point of the dissolving chamber. The dissolving chamber may have one or more nozzles, perforated circumferential pipes, or open tubes located near its upper entrance and directing one or more streams of wash down liquid along the side of the dissolving chamber in order to dislodge and partially dissolve dry materials falling from the discharge of the above mentioned dry feeder. This wash down may be intermittent in response to operation of the dry feeder, or may be intermittent in response to operation of the dry feeder plus a wash down period after each shut down of the dry feeder, or may be continuous. The wash down liquid may be water obtained from any source under sufficient pressure or may be working solution preferably obtained from a T located just upstream of the entrance to the liquid ejector. The flow and direction of water through the wash down means must be sufficiently variable to permit the flow to be adjusted so that it will prevent bridging of the bottom outlet of the conical dissolving chamber by the dry powdered material being fed by the dry feeder and still be sufficiently low in volume so that the wash down liquid will not overflow from the dissolving chamber.

The discharge of the dissolving chamber is preferably mounted directly on to and located directly above the vacuum side arm of the ejector. The discharge can be of convenient size but must be sufficiently large to minimize the tendency of dry materials to bridge the discharge opening.

The liquid ejector used in conjunction with the practice of the present invention can be of conventional design, preferably with the main stream of liquid moving in a straight line substantially horizontally through the ejector and with the vacuum side arm extending substantially vertically at right angles to the flow of the main stream. This arrangement will permit maximum pulling down of the dry powdered material and wash down liquid into the ejector. The ejector should be operated with sufficient inlet pressure to permit the liquid being discharged from the outlet of the ejector to flow to whatever pumps auxiliary transfer devices are necessary to return the exit stream to the point at which the replenished working solutions are to be employed. The section immediately downstream from the side arm should be sufficiently turbulent to permit ready mixing of the dry powdered material which remains undissolved at this point. In cases where it is undesirable to provide pumps or other auxiliary transfer devices downstream from the ejector, the inlet pressure of the ejector should be sufficient so that the liquid emerging from the discharge will be under sufficient pressure to move back to the work point under its own energy. The stream of liquid passing through the ejector may be continuous or may be operated only when the dry feeder is in operation or at times when the dry feeder is in operation plus a wash down period after each operation of the dry feeder. The concentration of the working solution passing through the ejector can be at whatever level is desired except that it must not, of course, be saturated in order that the dry powdered material will be able to be dissolved.

A feature of the present invention is the ability of the apparatus to create a vortex or swirl in the dissolving chamber at substantially all times when the dry feeder is operating in response to the sensor. This vortex permits air from the space directly above the dissolving chamber to be pulled downward while the dry feeder is operating, thus preventing water vapors from hot liquids in the dissolving chamber from rising upward to the discharge of the dry feeder where they could cause caking of the powdered hygroscopic material being fed. By drawing these vapors downward into the throat of the ejector, a major cause of clogging can now be alleviated.

The process of the present invention thus embodies the preparing of aqueous working solutions of a water soluble material which is hygroscopic in dry powdered form by the following steps:

(A) Intermittently discharging dry water soluble hygroscopic material into a conical dissolving chamber at a constant rate said material falling from the discharge of a dry feeder through an air space into said dissolving chamber, (B) At least during the discharge of the dry hygroscopic powdered materials, flushing said materials from said dissolving chamber with a stream of wash down liquid introduced at the top of said dissolving chamber and flowing down the sides of said dissolving chamber, (C) Removing said wash down liquid stream and said dry powdered material through the bottom outlet of said dissolving chamber under the vacuum drawn by a liquid operated ejector, the vacuum side arm of which communicates substantially directly with the bottom discharge of said dissolving chamber, Said wash down liquid flowing with sufficient velocity and at a sufficient rate to prevent bridging of the bottom outlet by the dry powdered material and at insufficiently high rate to overflow from said dissolving chamber, and maintaining a passage for air to be drawn from the space between the top of the dissolving chamber and the bottom of the dry feeder discharge downward into the throat of the ejector, (D) Passing a stream of working solution drawn from work tanks into the inlet of said ejector at sufficient pressure to maintain a vacuum on the side arm of the ejector, (E) Conducting the stream of working solution together with the dry powdered material and air drawn into the throat of the ejector away from the outlet of the ejector to a work tank containing working solution.

FIGURE 4 is a preferred wiring diagram for the electrical system of the embodiment of the present invention shown in FIGURES 2 and 3.

Figure 1:
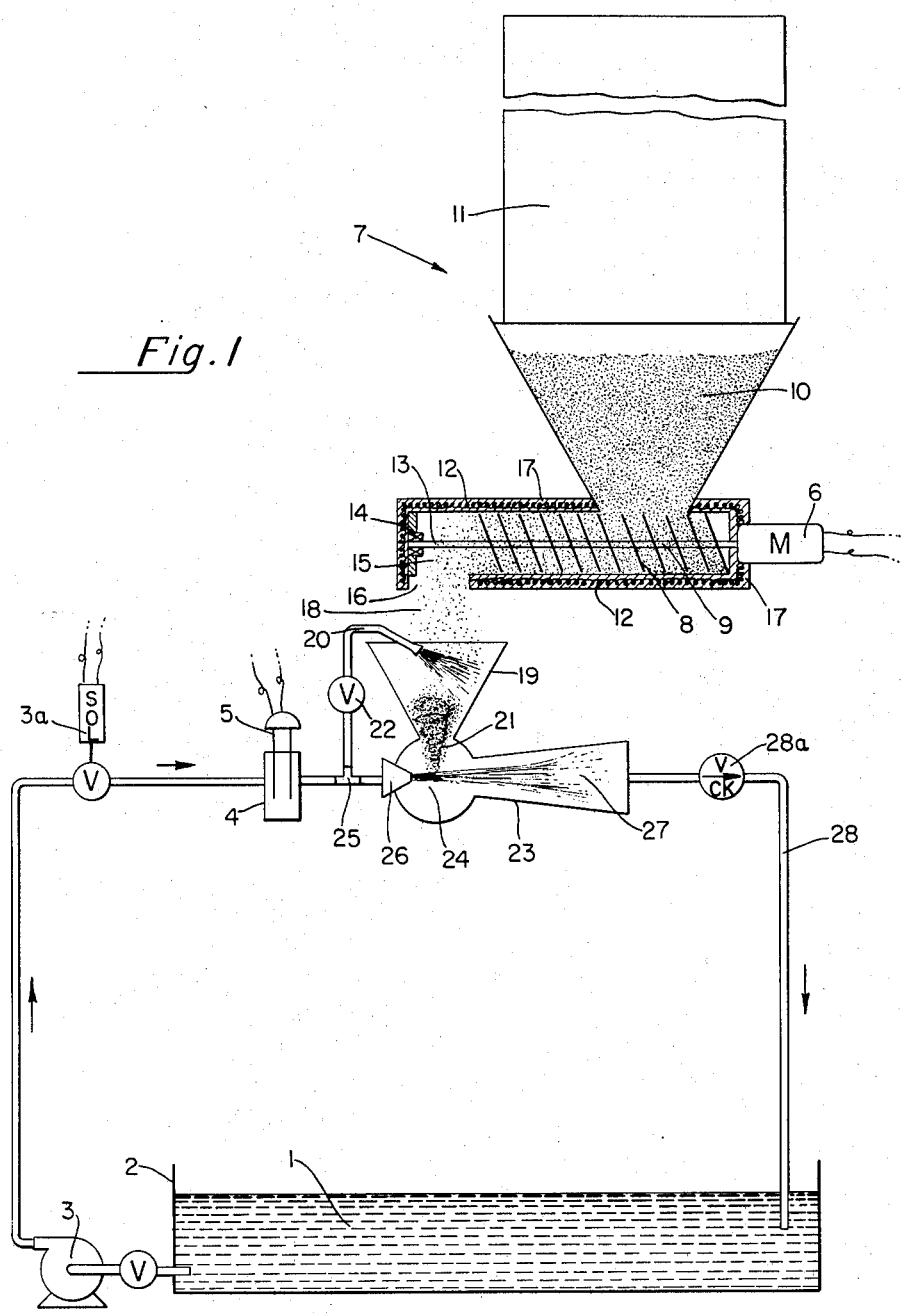
FIGURE 1 is an illustration of a preferred embodiment of the present invention showing the dry feeder, dissolving chamber, ejector and other accessories.

In FIGURE 1, working solution 1 is gradually depleted by treatment of work being dragged in and out of the work tanks 2. A portion of the solution flows from the work tank 2 into the pump 3 and is transferred to a location remote from the work tank room. The solution enters a testing chamber 4 in which a conductivity sensing probe 5 is immersed. The conductivity probe senses a decrease in the concentration of the solution below the pre-set level and closes its switch thereby energizing motor 6 on the dry feeder 7. The motor causes a constant rate advancement of the flights 8 on the feed screw 9 which withdraws material from the hopper of the dry feeder 10 from which it is replenished by falling from an inverted soluble dry powdered material drum 11. The material between the flights of the feed screw is heated by resistance heaters 12 to further minimize caking by reducing condensation or absorption of moisture from the surrounding air. A shaft extension 13 separates the flights of the feed screw from the discharge end support bearing 14. This provides a clear space 15 from which the dry powdered material can drop through the discharge opening 16 of the dry feeder. This free space 15 prevents clogging and packing of the dry powdered material against the discharge and feed screw bearing 14. To conserve electrical energy expended by the resistance heaters the feed screw chamber is lagged with insulation 17.

The dry powdered material falls freely from the discharge of the dry feeder through an air space 18 and into the conical dissolving chamber 19. A wash down device consisting of a length of tubing bent so as to direct its stream tangentially and slightly downward is located with its discharge end near the upper edge of the dissolving chamber 19. The wash down device is fed by a stream of working solution which is drawn from the main stream of working solution through a control valve 22 and thence through the wash down device 20. The effect of the tangential direction of the stream of wash down liquid is to create a swirl along the inside surface of the dissolving chamber 19. This swirl, combined with the vacuum pulled by the ejector 23, causes a vortex 21 to be formed at the bottom outlet of the discharge chamber. Air flows from the air space 18 above the discharge chamber downward through the vortex and into the throat of the ejector 24.

Returning to the working solution in the sensing chamber 4, the working fluid flows from the sensing chamber through the T 25 from which the wash down liquid is withdrawn and then into the ejector nozzle 26. In the throat of the ejector 24 the working solution expands by spraying, thus pulling in air, wash down liquid and partially dissolved dry powdered hygroscopic material. The dry powdered material is substantially dissolved in the turbulent region 27 down stream from the throat of the ejector. The working stream, now replenished with water soluble dry powdered material, returns to the work tanks through piping 28.

The conductivity cell is shown in its preferred location near the dry feeder ejector and away from the humidity and mechanical hazards of the work tank room. Alternatively in some instances, the sensing device can be installed directly in the work tank provided that suitable protection is provided. Where the sensing device is installed in the stream of working solution at a location near to the dry feeder-ejector combination, it is necessary that a constant flow be maintained through the test chamber 4 in order that the sensor may measure the conductivity of representative liquid and not be stagnated by a discontinuance of flow.

Flow through the ejector may be intermittent in cases where the conductivity cell is located in the work tank proper. In such cases the pump 3 operates intermittently in response to signals from the sensing device 5. The pump may shut off either immediately after the dry feeder motor 6 is de-energized or after a delay such as may be provided by a pneumatic type of relay installed in the pump circuit. Such a delay will provide a wash down period during which wash down liquid continues to be circulated in the dissolving tank 19 after the flow from the dry feeder discharge 16 has been discontinued. This provides a means of cleaning the dissolving chamber and preventing accumulation of hygroscopic materials.

In a typical application of the system, the flow into the ejector is approximately 10 gallons per minute at approximately 40 feet of head and the solution contains roughly one and one-half ounces per gallon of sodium hydroxide. The piping leading from the work tank to the ejector is ¾" schedule 40 steel pipe. The wash down liquid is provided by a ¼" schedule 40 steel pipeline in which is installed a needle valve and the flow of wash down liquid is approximately one to two gallons per minute directed into the conical dissolving chamber so as to cause a swirl as described above. The dissolving chamber is conical, approximately 7½" in diameter at the top narrowing to about 1" at the bottom outlet and the upper edge is approximately 6" above the bottom outlet. The dry feeder feeds roughly 40 pounds per hour of flake caustic soda (sodium hydroxide) a relatively hygroscopic material and the dry feeder operates approximately 5 to 10 minutes per hour.

The liquid leaving the ejector is at about ten feet of head (the pressure drop across the ejector is approximately 30 feet of head) and the pipe leading from the outlet of the ejector back to the work tank is 1" schedule 40 steel. The ejector employed is the standard Schutte and Koerting Company, Figure 264 described in their Bulletin No. 2 M. The pump in this specific example is operated in response to a reduction in the caustic soda content below about 2 ounces per gallon and the pump remains on for about 30 seconds after shut down of the dry feeder. This wash down period is provided by a pneumatic delayed type of relay installed in a pump energizing circuit. The liquid temperature is approximately 150° F. throughout the system.

Figure 2:
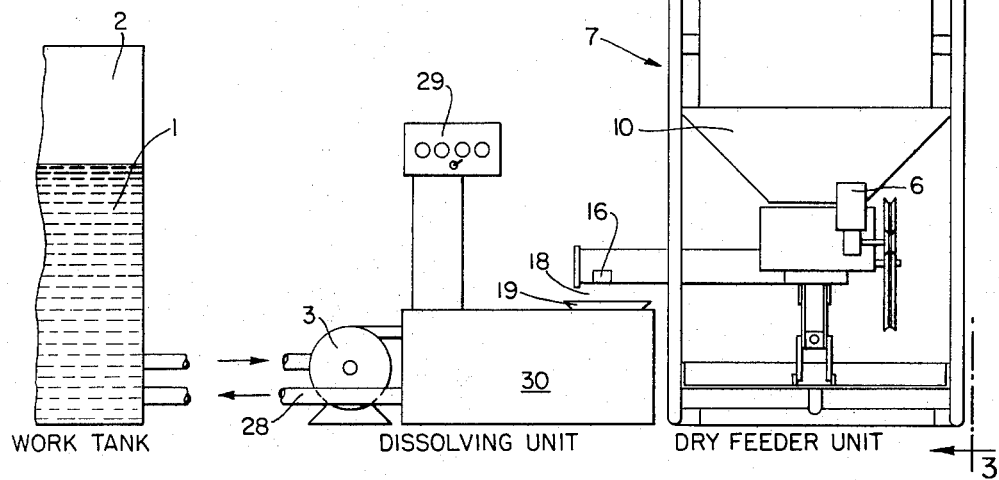
FIGURE 2 is another version of a preferred embodiment of the present invention wherein the components are utilized for ease of fluid installation and for compactness.

FIGURE 2 shows the components of the system mounted as two preassembled units. The dry feeder unit comprises a pipe or tubing frame on which is mounted the dry feeder with its discharge extending outward from the frame so as to be directly over the top of the dissolving chamber which is open and extending slightly from the cabinet 30 of the dissolving unit. This dry feeder unit also contains a support rack for the inverted drums of dry powdered hygroscopic material which are inserted into the hopper of the dry feeder unit.

Figure 3:
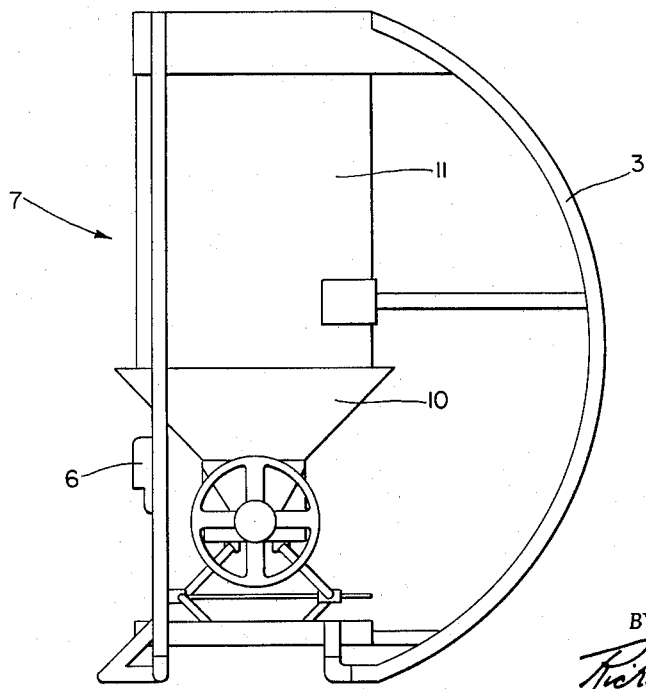
FIGURE 3 is a view facing at right angles to FIGURE 2, showing a preferred arrangement for the dry feeder assembly which permits the entire unit to be tilted on arcuate rails to facilitate replacement of the drums of hygroscopic dry powdered material.

As shown in FIGURE 3, the entire dry feeder unit may be rocked on one side of its frame 31 which is arcuate. Rocking the dry feeder unit from the normal to the inverted position permits ready insertion of drums of dry powdered material the tops of which have been previously removed, and eliminates high lifting of drums.

The dissolving unit is mounted on a cabinet 30 having an integral frame. A control panel 29 is supported at a convenient height above the cabinet 30. The dissolving chamber 19 extends slightly above the cabinet and a free air space 18 is maintained between the discharge of the dry feeder 16 and the top of the dissolving unit for the pulling of air downward into the throat of the ejector. Also located in the cabinet 30 are the conductivity sensor 5 and its cell 4, the wash down device 20 and its control valve 22 and the inter-connecting piping as shown schematically in FIGURE 1.

In addition to compactness and protection from mechanical hazards, the utilized construction shown in FIGURE 2 permits ready installation with only electrical and two liquid connections required to be made on the job site.

FIGURE 4 is a circuit diagram of the electrical components of the system described in FIGURES 2 and 3. S-1 is located inside the control cabinet and permits the cutting off of the electrical resistance heaters 12 under unusual operating conditions. Light B indicates that the heaters are on. Switch S-2 is the main switch to the control panel and light G indicates that the unit is on.

Relay CRA-1 is used to control the power to the feeder motor 6. Light A indicates that the dry feeder motor is energized, and flashing light R indicates an abnormal condition where the conductivity sensor has sensed low conductivity for a long period of time (preset on timer 32). This light R would be energized for example if the dry feeder hopper should be permitted to become empty of dry powdered hygroscopic material. The pump 3 is controlled by relay CRA-2. The normally closed solenoid valve 3A, prevents back flow when it is de-energized.

The conductivity sensor used in this embodiment of the present invention is the model number RGC-11 manufactured by Industrial Instrument Company, Cedar Grove, New Jersey and described in their brochure Catalog 27, copyrighted 1963.

The sensor in operation determines the conductivity of liquid flowing between two spaced probes and compensates this conductivity determination by sensing the temperature of the liquid. To preset the sensor, liquid of the lowest comparable concentration is poured into a container and the sensing probes are immersed in the liquid. The adjustment on the conductivity probe is turned until the relay CRA-1 just closes. The probes are then immersed in liquid of the highest desirable concentration and the sensor adjusted until the relay CRA-1 just opens. The sensor has then been preset to the desired upper and lower limits of concentration and is ready for operation.

As discussed above, an important characteristic of the system is the vortex or swirl which draws air downward away from the discharge of the dry feeder and thus permits operation with minimum clogging and pick up of moisture from humid air.

In operating ejectors it is important to avoid flashing of liquid since this may greatly reduce the vacuum being pulled at the side arm of the ejector. In general, flashing will not pose a serious problem with most aqueous solutions at temperatures below about 180 and 200° F. and even at such temperatures it may be minimized by proper control of the rate of flow and pressure drop across the ejector and by selection of suitable ejector geometry, all according to conventional methods advised by ejector manufacturers.

While the apparatus and method of the present invention are especially preferred in conjunction with sodium hydroxides, they are also useful with a wide range of hygroscopic materials fed in dry powdered form including other hydroxides, e.g. potassium hydroxide, chlorides, e.g. sodium chloride, silica compounds e.g. sodium silicate, sodium silica fluoride and silica gel and sulfates e.g. copper sulfate and magnesium sulfate.

It should be understood that the foregoing examples are intended to be merely illustrative of the invention and are to be taken to limit it in no manner and to no degree.

What is claimed is:

1. Apparatus for maintaining a preset range of concentration of a water soluble material which is hygroscopic in dry powdered form by feeding said material to an aqueous solution at a controlled rate in response to a signal from a concentration-measuring sensor, comprising in combination:
   (A) A sensor for detecting low concentrations of a water soluble inorganic hydroscopic salt in an aqueous working solution.
   (B) An intermittently operated dry feeder for powderd materials operating in response to a signal from said sensor and feeding dry materials at a preset constant rate, said dry feeder being shut off by a signal from said sensor indicating a satisfactorily high concentration in said working solutions.
   (C) A substantially conical dissolving chamber located directly beneath the discharge of said dry feeder, said dissolving chamber having wash down means for continuously injecting a stream of wash down liquid into said chamber to wash said hygroscopic powdered materials downward through the bottom outlet of said dissolving chamber, the flow of said wash down liquid being sufficient to prevent bridging of the bottom outlet of said conical dissolving chamber and being insufficient to cause overflowing of said wash down liquid from said dissolving chamber.
   (D) A liquid operated ejector having an inlet and an outlet and a vacuum side arm substantially at right angles to the main path between said inlet and said outlet, said vacuum side arm being below and communicating substantially directly with the bottom discharge of said conical dissolving chamber.
   (E) Means for delivering a stream of said working solution to the inlet of said ejector, said stream pulling a vacuum on said side arm and passing out the outlet of said ejector,
   (F) Conduit means for conducting said stream of working solution together with the powdered material from said conical discharge chamber from the outlet of said ejector back to a point of use of said working fluid.

2. The apparatus of claim 1 in which the sensor is located in a test chamber mounted to determine concentration in the stream of solution upstream from and substantially adjacent to the inlet of the ejector and some flow is maintained through the sensor test chamber at substantially all times when the system is in operation.

3. The apparatus of claim 1 in which the dry feeder comprises a rotating feed screw supported at its discharge end by a bearing, said feed screw conveying the dry powdered material substantially horizontally from the bottom of a supply hopper to a discharge point where dry powdered material falls substantially vertically downward into the dissolving chamber, said feed screw having screw flights terminating substantially at the discharge point, and having a flightless shaft extension between the flighted portion of the feed screw and the discharge end bearing.

4. Apparatus of claim 3 having electrical resistance heaters arranged and electrically connected to heat, the material being conveyed by the feed screw to a temperature at least above the dew point of the surrounding air.

5. Apparatus of claim 1 in which the dry feeder is supplied with dry powered material by inverting a drum of said material into a supply hopper, said dry feeder being mounted on a frame having provision for inversion of the feeder-frame assembly and having a drum support substantially parallel to the top of said hopper and spaced away from said hopper by a distance approximately equal to the height of said dry material drums, so that the feeder-frame assembly can be placed in the inverted position, a drum placed on said drum support and said assembly returned to the upright position with said drum inverted and communicating with said supply hopper, the discharge of said dry feeder extending from said frame and being positioned vertically over said dissolving chamber, said dissolving chamber being stationary when said frame is inverted.

6. The apparatus of claim 5 wherein the frame comprises arcuate vertical members which permit the dry feeder-frame assembly to be rocked on said arcuate vertical members from an upright to a vertical position and thereafter rocked to an upright position.

7. The apparatus of claim 1 wherein the dry powdered material is sodium hydroxide and the liquid solutions are at 120° F. or above throughout the system.

8. The process of preparing aqueous working solutions of a water soluble material which is hygroscopic in dry powdered form comprising the steps of:
   (A) Intermittently discharging dry water soluble hygroscopic material into a conical dissolving chamber at a constant rate said material falling from the discharge of a dry feeder through an air space into said dissolving chamber,
   (B) At least during the discharge of the dry hygroscopic powdered materials, flushing said materials from said dissolving chamber with a stream of wash down liquid introduced at the top of said dissolving chamber and flowing down the sides of said dissolving chamber,
   (C) Removing said wash down liquid stream and said dry powdered material through the bottom outlet of said dissolving chamber under the vacuum drawn by a liquid operated ejector, the vacuum side arm of which communicates substantially directly with the bottom discharge of said dissolving chamber, said wash down liquid flowing with sufficient velocity and at a sufficient rate to prevent bridging of the bottom outlet by the dry powdered material and at insufficiently high rate to overflow from said dissolving chamber, and maintaining a passage for air to be drawn from the space between the top of the dissolving chamber and the bottom of the dry feeder discharge downward into the throat of the ejector,
   (D) Passing a stream of working solution drawn from work tanks into the inlet of said ejector at sufficient pressure to maintain a vacuum on the sidearm of the ejector,
   (E) Conducting the stream of working solution together with the dry powdered material and air drawn into the throat of the ejector away from the outlet of the ejector to a point of use of said working solution.

9. The process of claim 8 wherein the dry powdered materials are fed to the discharge point of the dry feeder by conveying them substantially horizontally by means of a constantly rotating feed screw and where said materials being conveyed by said feed screw are heated at least to the dew point of the surrounding air.

10. The process of claim 9 in which the dry feeder operates in response to a sensing device which determines the concentration of the working solution, and energizes the drive means of the dry feeder when the concentration of the working solution falls below a preset level.

11. The process of claim 10 wherein the sensor determines concentration by measuring the conductivity of the working solution.

References Cited by the Examiner

UNITED STATES PATENTS 3,010,615  11/61  Smith et al. _____ 222—333 X

LOUIS J. DEMBO, *Primary Examiner.*